(12) United States Patent
Nguyen et al.

(10) Patent No.: US 11,182,980 B1
(45) Date of Patent: Nov. 23, 2021

(54) PROCEDURAL GENERATION OF COMPUTER OBJECTS

(71) Applicant: Apple Inc., Cupertino, CA (US)

(72) Inventors: Shem Nguyen, Oakland, CA (US); Arnold Henry Cachelin, Sunnyvale, CA (US); Novaira Masood, Sunnyvale, CA (US); Eric John Geusz, San Francisco, CA (US); Pravalika Avvaru, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/169,988

(22) Filed: Feb. 8, 2021

Related U.S. Application Data

(60) Provisional application No. 63/000,017, filed on Mar. 26, 2020.

(51) Int. Cl.
*G09G 5/00* (2006.01)
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2012* (2013.01)

(58) Field of Classification Search
CPC ...... G06T 19/003; G06T 19/006; G06T 19/20
See application file for complete search history.

(56) References Cited

U.S. PATENT DOCUMENTS

| | | | |
|---|---|---|---|
| 7,945,097 B2 | 5/2011 | Biswas et al. | |
| 9,064,147 B2 | 6/2015 | Ouyang et al. | |
| 9,348,877 B2 | 5/2016 | Ramani et al. | |
| 10,133,949 B2 | 11/2018 | Taranta, II et al. | |
| 10,248,664 B1 | 4/2019 | Shen et al. | |
| 2011/0090219 A1* | 4/2011 | Kruglick | G06Q 30/02 345/420 |
| 2015/0199450 A1 | 7/2015 | Elkin et al. | |

(Continued)

FOREIGN PATENT DOCUMENTS

WO 2017168125 A1 10/2017

OTHER PUBLICATIONS

Jaideep Ray, "Sketchseeker: Finding Similar Sketches," Thesis Paper submitted May 2016 to the Office of Graduate and Professional Studies of Texas A&M University, pp. 1-57, 2016.

*Primary Examiner* — Charles Tseng
(74) *Attorney, Agent, or Firm* — Fernando & Partners, LLP

(57) ABSTRACT

Various implementations disclosed herein include devices, systems, and methods for identifying virtual object kits that may be used to generate a target virtual object. In some implementations, a method includes obtaining a plurality of virtual object kits that generate variations of respective virtual object types. Each virtual object kit is associated with a characteristic parameter. For each virtual object kit, a subset of possible virtual object variations of the virtual object type is generated by assigning corresponding values to the characteristic parameter based on a distribution criterion. A subset of the plurality of virtual object kits is identified based on the target virtual object being within a similarity threshold of one or more virtual object variations generated using the subset of the plurality of virtual object kits in response to a request to assemble a target virtual object.

20 Claims, 14 Drawing Sheets

(56) References Cited

U.S. PATENT DOCUMENTS

2016/0253842 A1\* 9/2016 Shapira .................. G06F 3/017
   345/633
2017/0052676 A1\* 2/2017 Pulier ................. G06F 3/04883
2019/0287023 A1 9/2019 Kasahara et al.
2019/0370617 A1 12/2019 Singh et al.

\* cited by examiner

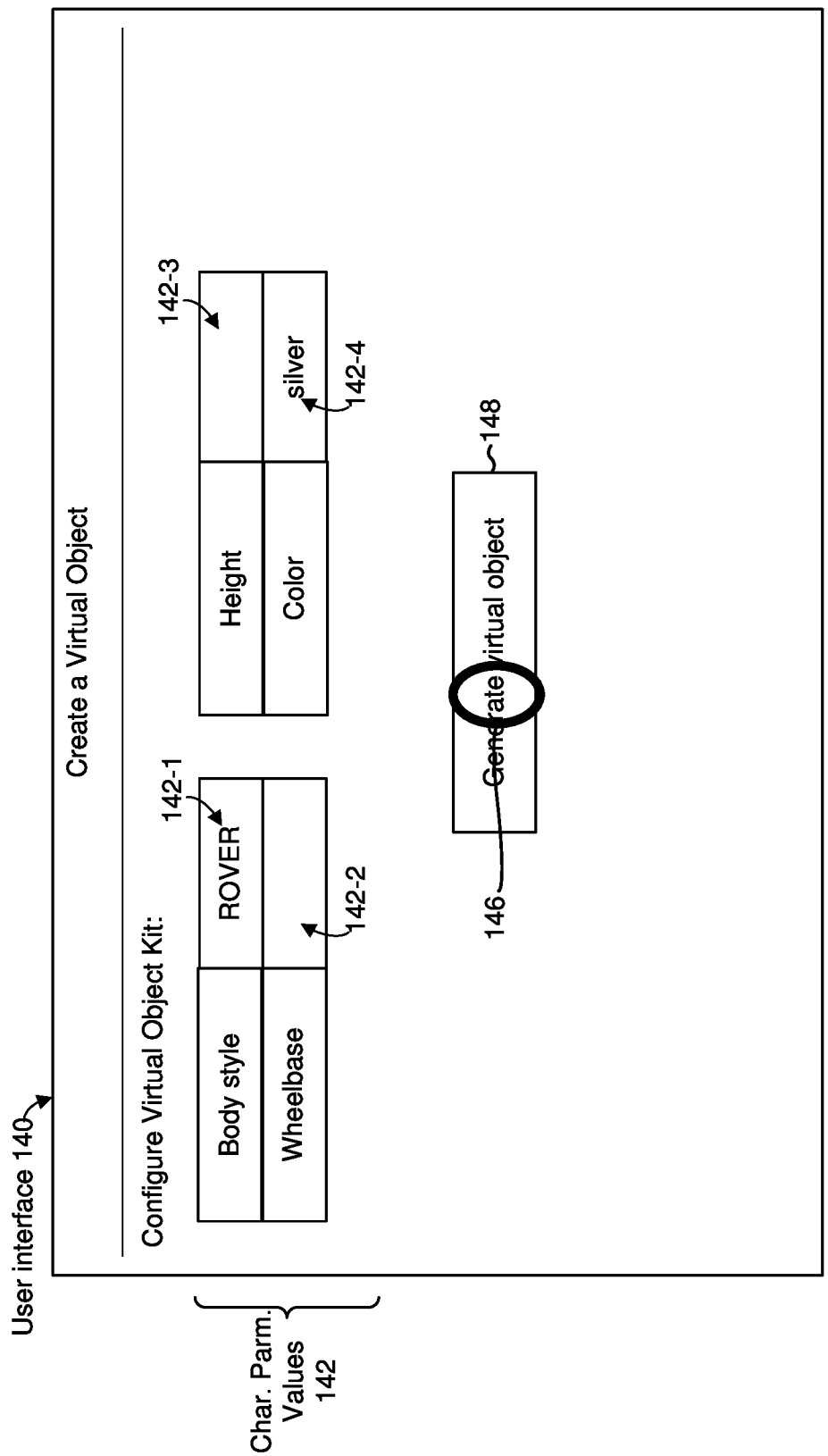

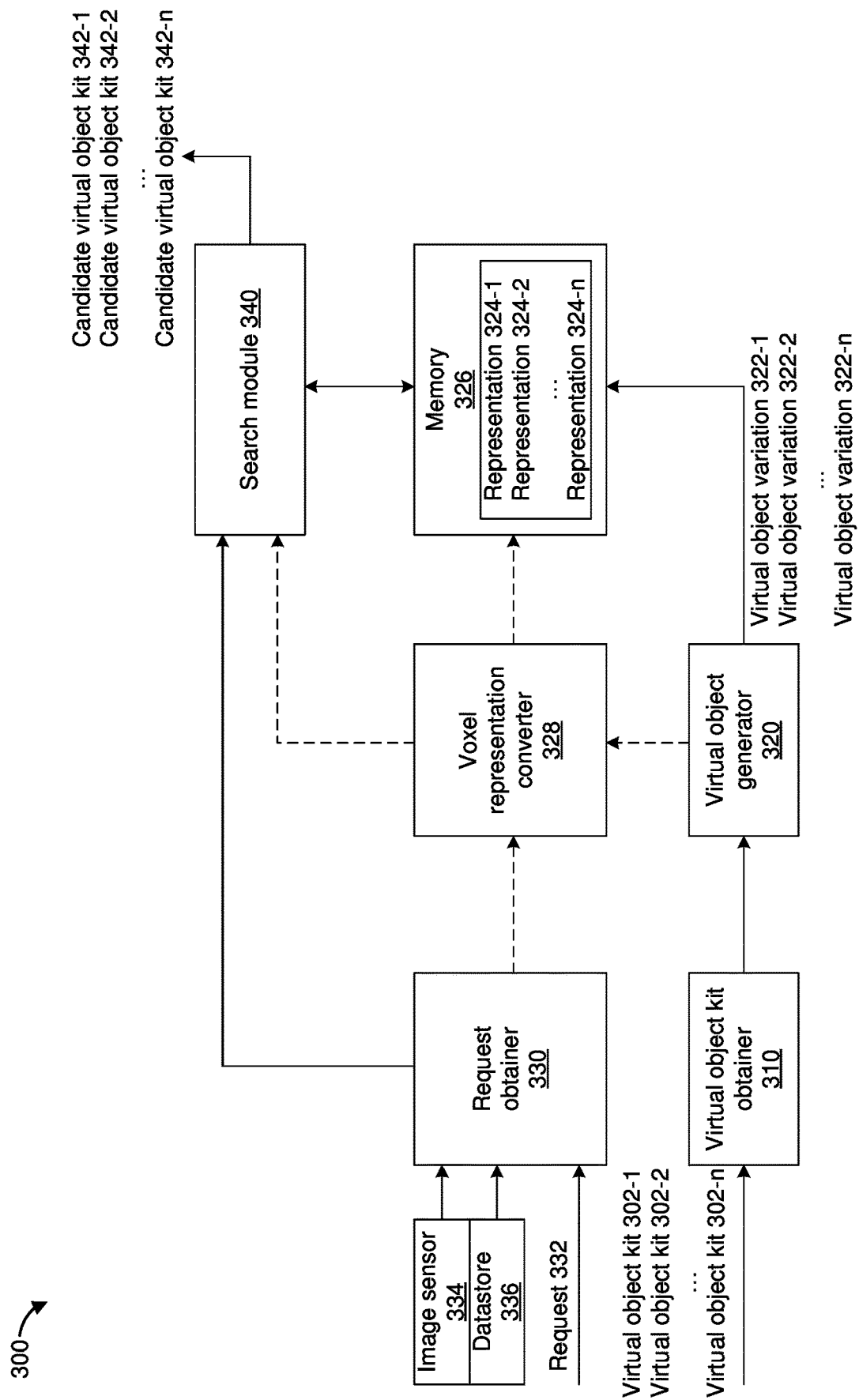

400

Obtain a plurality of virtual object kits that generate variations of respective virtual object types; each virtual object kit is associated with a characteristic parameter ⎯410

For each virtual object kit, generate a subset of possible virtual object variations of the virtual object type by assigning corresponding values of the characteristic parameter based on a distribution criterion ⎯420

In response to a request to assemble a target virtual object, identify a subset of the plurality of virtual object kits based on the target virtual object being within a similarity threshold of one or more virtual object variations generated using the subset of virtual object kits ⎯430

Figure 4A

PROCEDURAL GENERATION OF COMPUTER OBJECTS

CROSS-REFERENCE TO RELATED APPLICATION

This application claims the benefit of U.S. Provisional Patent App. No. 63/000,017, filed on Mar. 26, 2020, which is incorporated by reference in its entirety.

TECHNICAL FIELD

The present disclosure generally relates to techniques for procedurally generating graphical computer objects.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1B-1G depict example user interfaces for use in various XR technologies.

FIG. 3 is a block diagram of an example emergent content engine in accordance with some implementations.

FIGS. 4A-4C are flowchart representations of a method for identifying a virtual object kit for generating a target virtual object in accordance with some implementations.

Figure 1A:
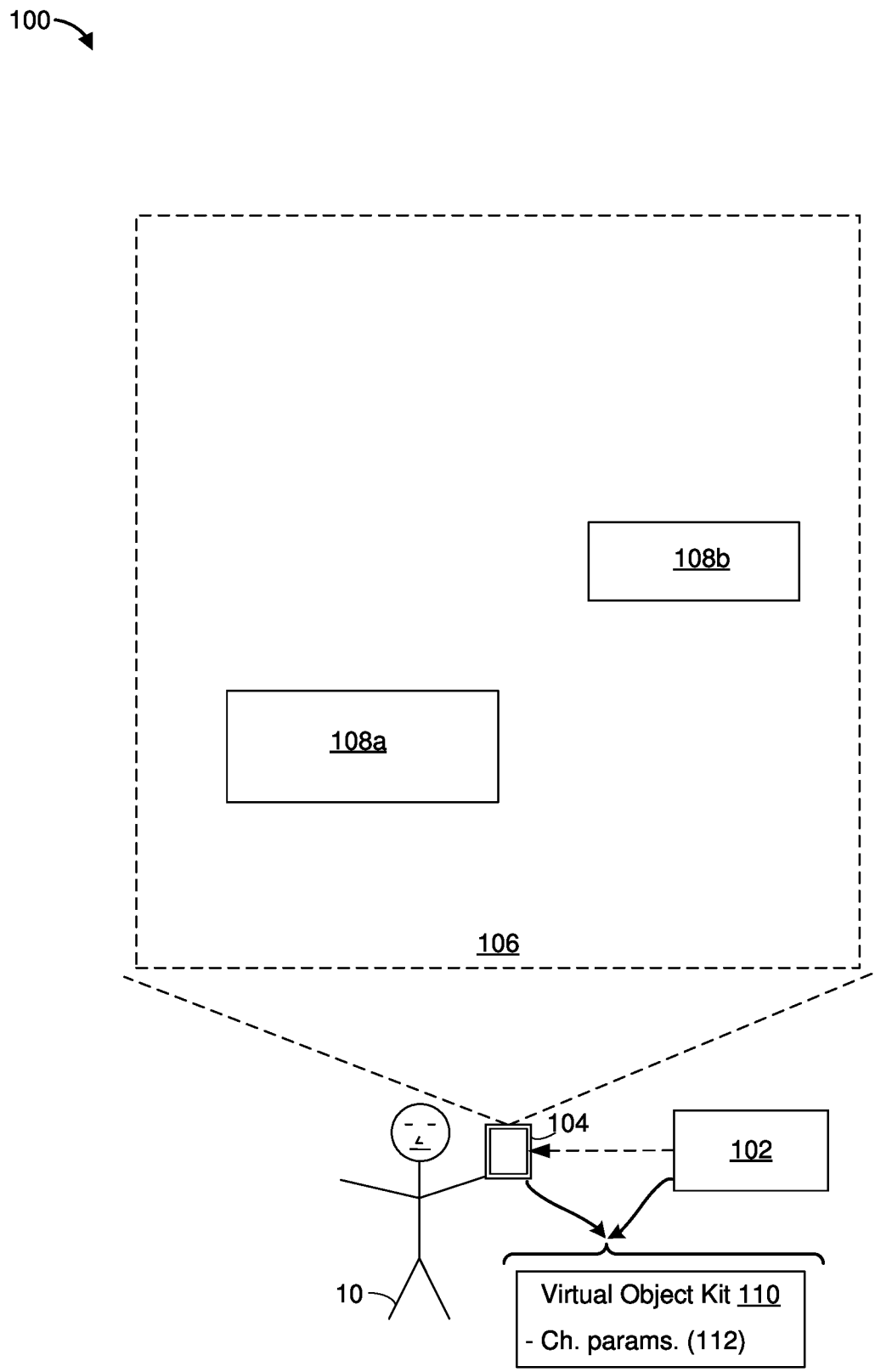
FIG. 1A depicts an exemplary system for use in various extended reality (XR) technologies.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for identifying virtual object kits that may be used to generate a target virtual object. In some implementations, a method includes obtaining a plurality of virtual object kits that generate variations of respective virtual object types. Each virtual object kit is associated with a characteristic parameter. For each virtual object kit, a subset of possible virtual object variations of the virtual object type is generated by assigning corresponding values to the characteristic parameter based on a distribution criterion. A subset of the plurality of virtual object kits is identified based on the target virtual object being within a similarity threshold of one or more virtual object variations generated using the subset of the plurality of virtual object kits in response to a request to assemble a target virtual object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a device directs an object to perform one or more actions in order to effectuate (e.g., advance, satisfy, complete, and/or achieve) one or more objectives (e.g., results and/or goals). The object may be part of a computer graphical environment such as an extended reality (XR) environment. In some implementations, the object (hereafter "XR object") is associated with a particular objective, and the XR object performs actions that improve the likelihood of effectuating that particular objective.

In some embodiments, a virtual object kit comprises a software stack that can be used to procedurally generate content such as virtual objects or other computer-generated graphical objects. In some implementations, variations on a type of virtual object can be generated by adjusting one or more characteristic parameters in a corresponding virtual object kit. For example, adjusting characteristic parameters in a virtual object kit for generating virtual sitting furniture can lead to the generation of different types of virtual sitting furniture, such as couches, stools, thrones, and the like.

Because some characteristic parameters may have floating point values, the number of possible output virtual objects that can be generated by a given virtual object kit may be very large. Searching for a desired virtual object from among a set of procedurally generated virtual objects may be difficult because it may not be feasible to store every configuration or output of a virtual object kit. In addition, identifying a suitable virtual object kit to generate a target virtual object may be difficult when multiple virtual object kits may be used to generate the target virtual object. As the number of virtual object kits increases, the finding a virtual object kit to generate a target virtual object may be complicated further.

The present disclosure provides methods, systems, and/or devices for identifying virtual object kits that may be used to generate a target virtual object. Various examples of electronic systems and techniques for using such systems in relation to various extended reality technologies are described. In some implementations, virtual object kits are used to generate variations of respective virtual object types, known as virtual object variations. The virtual object variations may be generated by varying a characteristic parameter that is associated with an associated virtual object kit. When a request to assemble a target virtual object is received, one or more virtual object kits may be identified based on a degree of similarity between the target virtual object and the virtual object variations previously generated using the virtual object kits.

In some implementations, the virtual object variations are stored as visual representations, e.g., images. The request to assemble the target virtual object may include an image of the target virtual object. An image search may be performed based on the image of the target virtual object, e.g., as compared with the images of the virtual object variations generated by the virtual object kits. In some implementations, a value of the characteristic parameter that corresponds to the target virtual object is determined based on characteristic parameter values associated with virtual object variations generated using the virtual object kit.

In some implementations, characteristic parameter values associated with the virtual object variations are stored as representations, e.g., voxel representations, in a database. Characteristic parameter values may be selected and spaced apart in a voxel coordinate space, e.g., according to a distribution criterion, such that they are representative of the types of virtual objects that the virtual object kit can be used to generate. To conserve computing resources, a representative sample of characteristic parameter values (e.g., rather than all characteristic parameter values) may be stored in the database. For example, characteristic parameter values that result in similar virtual objects may not be stored.

In some implementations, a search is converted using a machine-learned model to a voxel representation of a target virtual object. The voxel representation may be compared with the pre-generated voxel representations stored in the database to identify one or more voxel representations that are within a similarity threshold of the voxel representation of the target virtual object. This information may be used to determine which virtual object kit should be used to generate the target virtual object. In some implementations, the information is used to determine the characteristic parameter values that result in the target virtual object.

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 104. In the example of FIG. 1A, the electronic device 104 is being held by a user 10. In some implementations, the electronic device 104 includes a smartphone, a tablet, a laptop, or the like.

As illustrated in FIG. 1A, the electronic device 104 presents an extended reality (XR) environment 106. In some implementations, the XR environment 106 is generated by the controller 102 and/or the electronic device 104. In some implementations, the XR environment 106 includes a virtual environment that is a simulated replacement of a physical environment. In other words, in some implementations, the XR environment 106 is synthesized by the controller 102 and/or the electronic device 104. In such implementations, the XR environment 106 is different from a physical environment in which the electronic device 104 is located. In some implementations, the XR environment 106 includes an augmented environment that is a modified version of a physical environment. For example, in some implementations, the controller 102 and/or the electronic device 104 modify (e.g., augment) the physical environment in which the electronic device 104 is located to generate the XR environment 106. In some implementations, the controller 102 and/or the electronic device 104 generate the XR environment 106 by simulating a replica of the physical environment in which the electronic device 104 is located. In some implementations, the controller 102 and/or the electronic device 104 generate the XR environment 106 by removing and/or adding items from the simulated replica of the physical environment in which the electronic device 104 is located. In some implementations, the XR environment 106 is referred to as a graphical environment.

In some implementations, the XR environment 106 includes various virtual objects such as a virtual dirt bike 108a and a virtual sports bike 108b. In some implementations, the virtual objects are referred to as graphical objects or XR objects. In various implementations, the virtual objects represent physical articles. For example, in some implementations, the virtual objects represent equipment (e.g., machinery such as planes, tanks, robots, etc.). In the example of FIG. 1A, the virtual dirt bike 108a represents a physical dirt bike and the virtual sports bike 108b represents a physical sports bike. In some implementations, the virtual objects represent entities (e.g., equipment) from fictional materials. In some implementations, the virtual objects represent entities from a physical environment, including things located inside and/or outside of the XR environment 106. In some implementations, the virtual objects correspond to various characters. In some implementations, the virtual objects represent characters from fictional materials, such as movies, video games, comics, and novels. In some implementations, the XR environment 106 includes virtual objects that represent characters from different fictional materials (e.g., from different movies, games, comics, and/or novels).

In some implementations, the XR environment 106 is generated based on a user input from the user 10. For example, in some implementations, the electronic device 104 receives a user input indicating a terrain for the XR environment 106. In such implementations, the controller 102 and/or the electronic device 104 configure the XR environment 106 such that the XR environment 106 includes the terrain indicated via the user input. In the example of FIG. 1A, the XR environment 106 represents a road with the virtual dirt bike 108a and the virtual sports bike 108b. In some implementations, the user input indicates environmental conditions for the XR environment 106. In such implementations, the controller 102 and/or the electronic device 104 configure the XR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the XR environment 106. In such implementations, the controller 102 and/or the electronic device 104 maintain and present the XR environment 106 during the specified time period.

In some implementations, the controller 102 and/or the electronic device 104 determine (e.g., generate) actions for the virtual objects based on a user input from the user 10. For example, in some implementations, the electronic device 104 receives a user input indicating placement of the virtual dirt bike 108a and/or the virtual sports bike 108b. In such implementations, the controller 102 and/or the electronic device 104 position the virtual dirt bike 108a and the virtual sports bike 108b in accordance with the placement indicated by the user input. In some implementations, the user input indicates specific actions that the virtual object(s) are permitted to perform (e.g., drive rightward for the virtual dirt bike 108a and drive leftward for the virtual sports bike 108b). In such implementations, the controller 102 and/or the electronic device 104 select the actions for the virtual object(s) from the specific actions indicated by the user input. In some implementations, the controller 102 and/or the electronic device 104 forgo actions that are not among the specific actions indicated by the user input.

In various implementations, the controller 102 and/or the electronic device 104 use a virtual object kit 110 to procedurally generate content, e.g., virtual objects. In some implementations, the virtual object kit 110 is used to generate a type of virtual object with which the virtual object kit 110 is associated, such as a motorbike. The controller 102 and/or the electronic device 104 may generate variations on the type of virtual object with which the virtual object kit 110 is associated by configuring values of one or more characteristic parameters 112. For example, one configuration of characteristic parameters 112 may result in the creation of the virtual dirt bike 108a, while another configuration of the characteristic parameters 112 may result in the creation of the virtual sports bike 108b.

In some implementations, the controller 102 and/or the electronic device 104 use the virtual object kit 110 to generate a plurality of virtual object variations. For example, the controller 102 and/or the electronic device 104 may assign values to the characteristic parameters 112 to generate the virtual object variations such as a virtual sports bike, a virtual cruising bike, a virtual dirt bike, a virtual electric bike, a virtual three-wheeled bike, etc. To conserve computational resources, in some implementations, the controller 102 and/or the electronic device 104 generate a subset of possible virtual object variations, e.g., rather than the full range of possible virtual object variations. For example, the controller 102 and/or the electronic device 104 may assign values to the characteristic parameters 112 based on a distribution criterion, e.g., rather than assigning all possible values to the characteristic parameters 112.

In some implementations, representations of the virtual object variations corresponding to the characteristic parameter values are stored, e.g., in a database. For example, the virtual object variations may be stored as images. In some implementations, characteristic parameter values associated with the virtual object variations are stored as representations, e.g., voxel representations. For example, characteristic parameter values may be mapped to coordinates, e.g., in a three-dimensional coordinate system. The characteristic parameter values may be mapped to color values, such as RGB values. In some implementations, a representative sample of characteristic parameter values (e.g., rather than all characteristic parameter values) is stored in the database. For example, characteristic parameter values that result in similar virtual objects may not be stored.

Figure 1B:
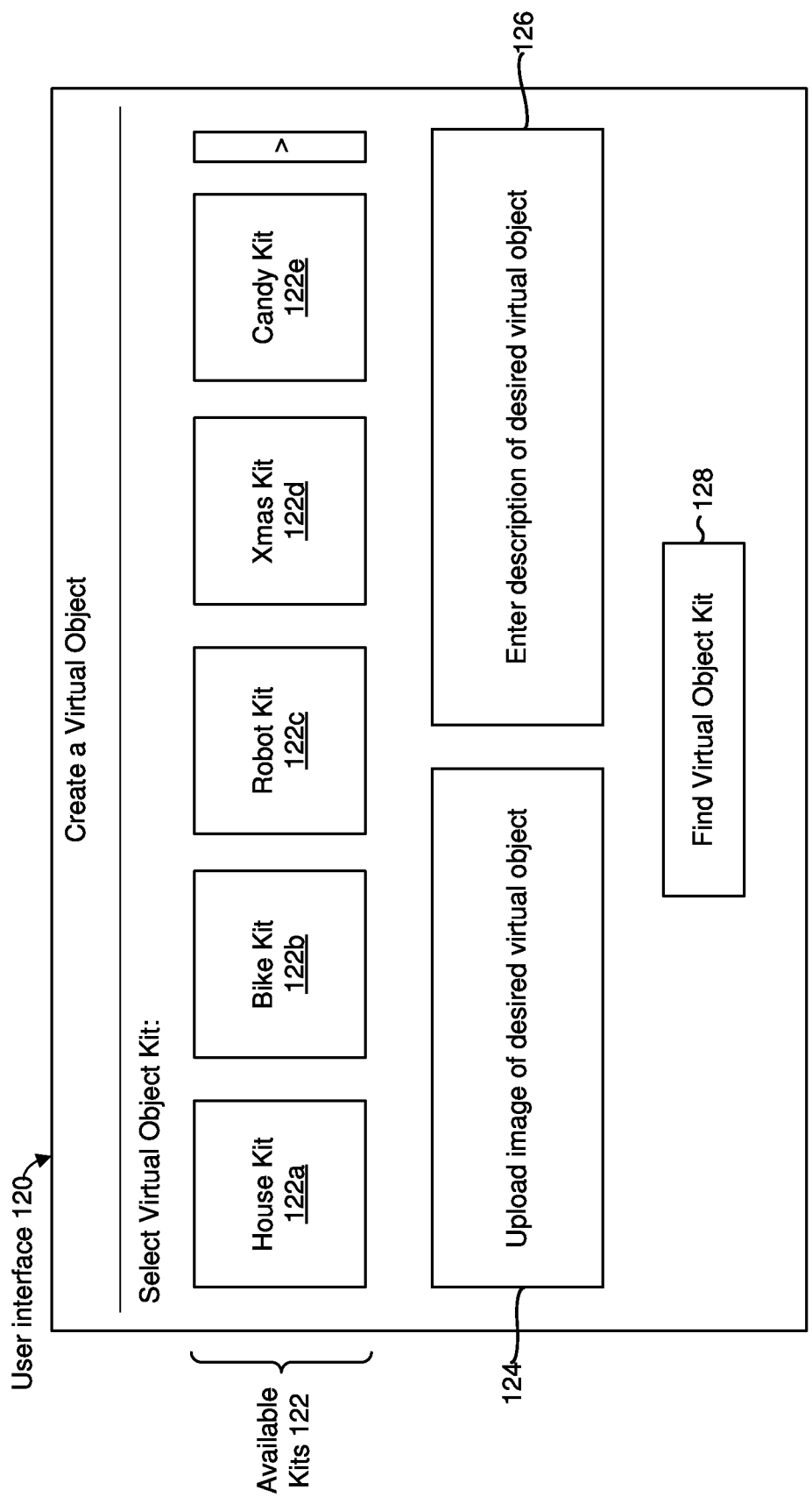
Figure 1C:
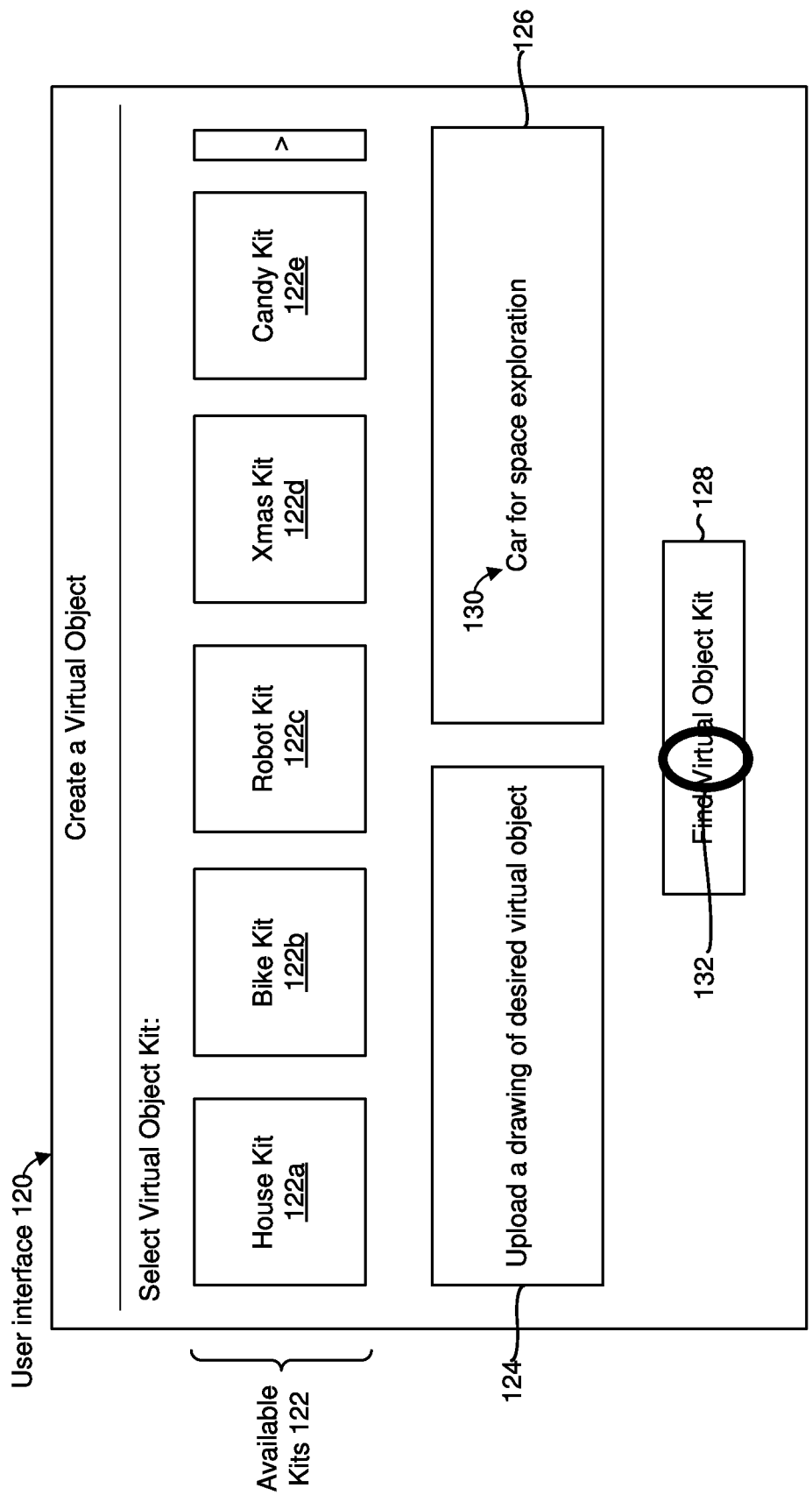

FIG. 1B is a diagram of a user interface 120 for identifying a virtual object kit for generating a virtual object. The user interface 120 may be displayed, for example, by the electronic device 104 of FIG. 1A. In some implementations, the user interface 120 enables the user 10 of the electronic device 104 to identify a virtual object kit (e.g., among multiple virtual object kits) for generating a desired virtual object. In some implementations, the user interface 120 displays representations of available virtual object kits 122. For example, as illustrated in FIG. 1B, the user interface 120 may display respective representations of a house kit 122a, a bike kit 122b, a robot kit 122c, an Xmas kit 122d, and a candy kit 122e. In some implementations, the user interface 120 displays affordances for entering a search query specifying a target virtual object (e.g., a desired virtual object). For example, the user interface 120 may display an affordance 124 (e.g., a drag-and-drop region, an upload button or a camera affordance) that, when activated, enables a user to upload an image of the target virtual object, e.g., by selecting an image from an image gallery on the electronic device 104 or by capturing an image of the target virtual object using an image sensor. The user interface 120 may display an affordance 126 (e.g., a textbox) that, when activated, enables a user to enter a text-based description of the target virtual object. In some implementations, the user interface 120 displays an affordance 128 (e.g., a find kit button) that, when activated, triggers the controller 102 and/or the electronic device 104 to identify which virtual object kit 122 can generate the target virtual object. FIG. 1C illustrates a user input 130 corresponding to a text-based description of the target virtual object, e.g., "bike for space exploration." FIG. 1C further illustrates a user input 132 activating the affordance 128. In some implementations, when the affordance 128 is activated, the controller 102 and/or the electronic device 104 identify a virtual object kit 122 that can generate the target virtual object, e.g., a virtual bike for space exploration.

In some implementations, the controller 102 and/or the electronic device 104 use a machine-learned model to convert the text-based description to a voxel representation of the target virtual object. The voxel representation may be compared with the pre-generated voxel representations stored in the database to identify one or more voxel representations that are within a similarity threshold of the voxel representation of the target virtual object. This information may be used to determine the characteristic parameter values that result in the target virtual object.

Figure 1D:
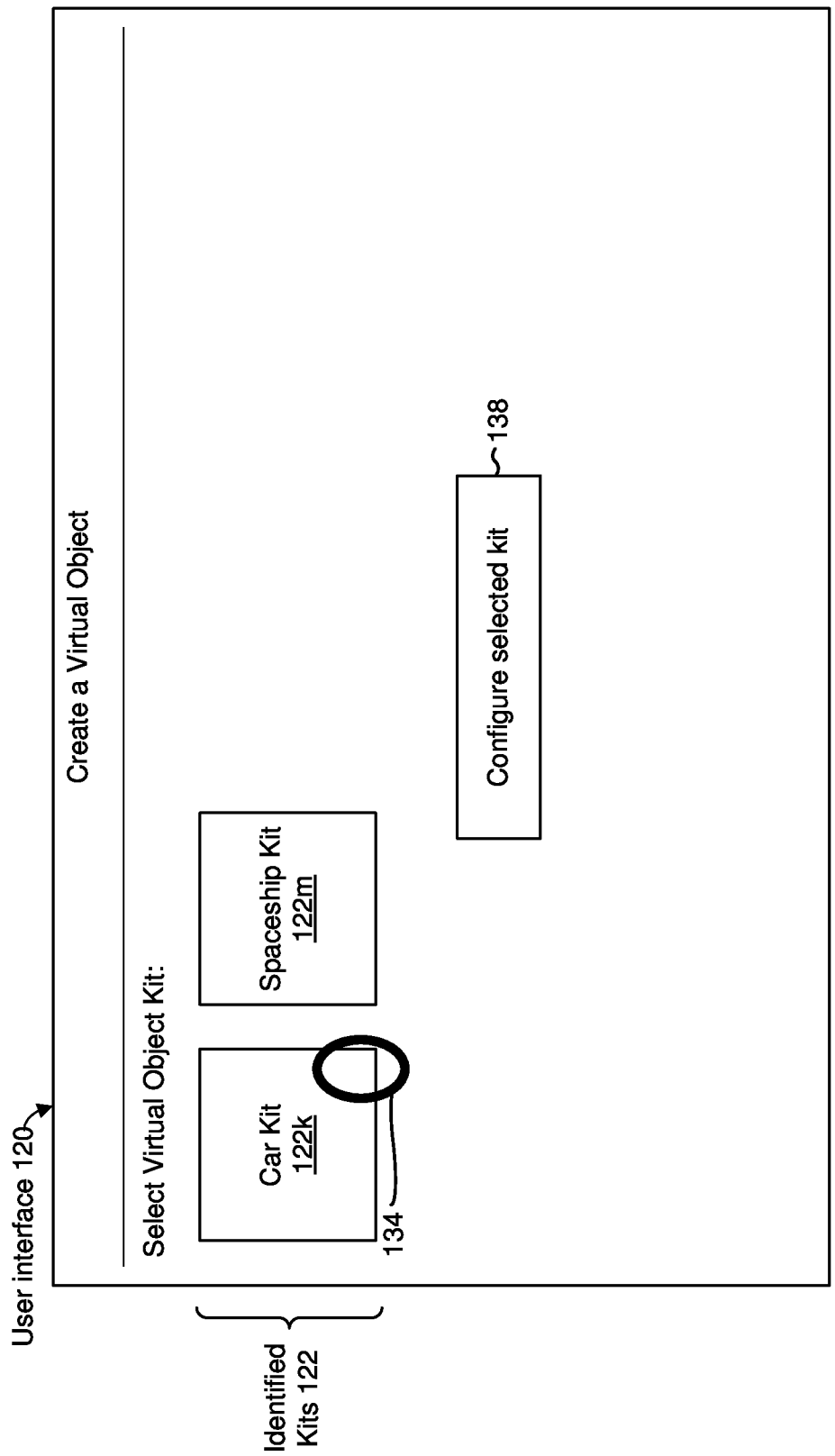
Figure 1E:
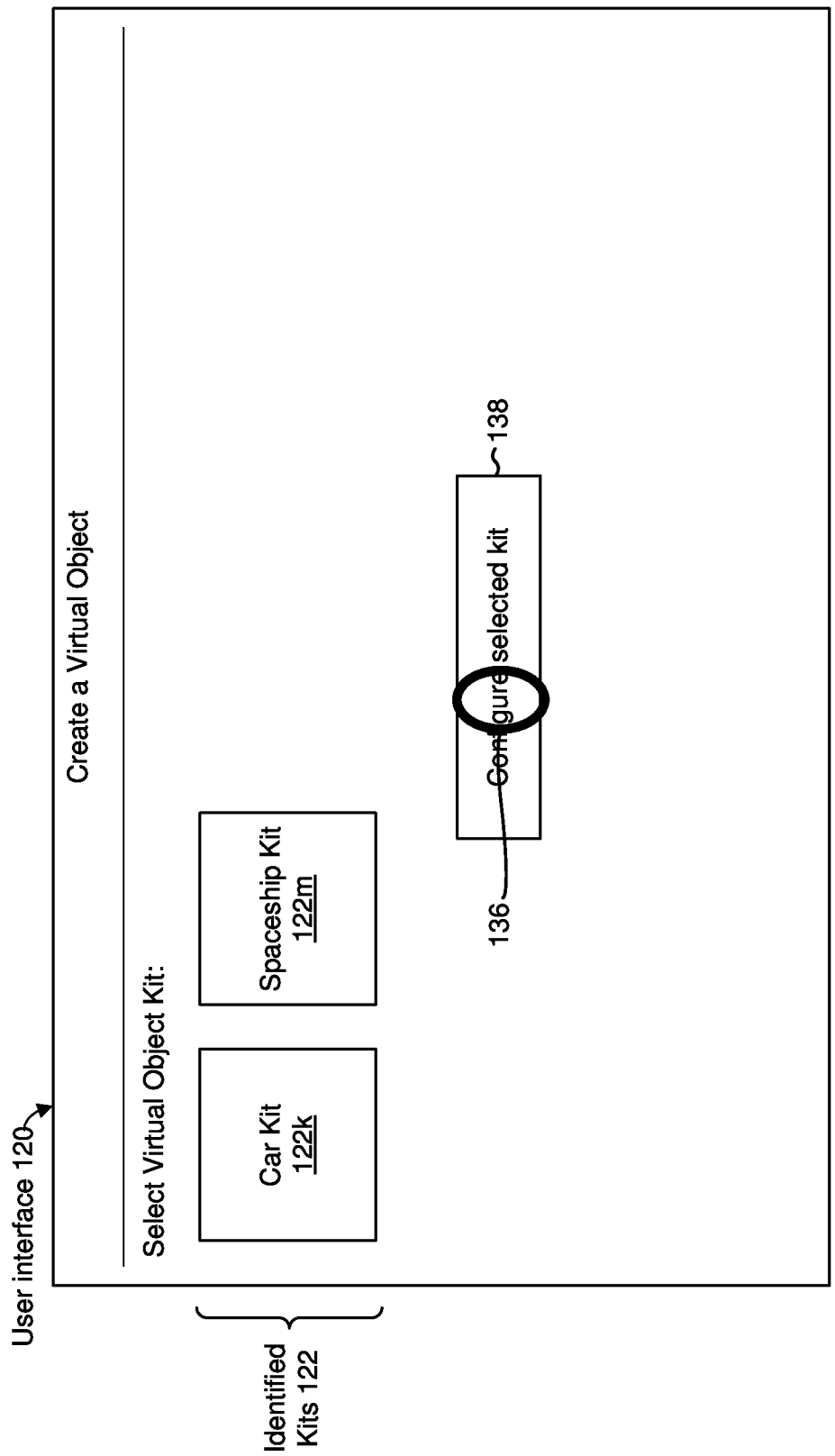

In some implementations, the controller 102 and/or the electronic device 104 identify multiple virtual object kits that can be used to generate virtual objects of corresponding types. FIG. 1D illustrates virtual object kits 122 that can generate a target virtual object, according to an example. As shown in FIG. 1D, the controller 102 and/or the electronic device 104 may determine that a bike kit 122k and a spaceship kit 122m can generate a virtual bike for space exploration. The user 10 may select one of the identified virtual object kits 122 to use for generating the virtual bike for space exploration, for example, by providing a user input 134 on a representation of an identified virtual object kit 122 (e.g., the bike kit 122k). FIG. 1E illustrates a user input 136 activating an affordance 138 (e.g., a configure kit button). When activated, the affordance 138 may trigger the controller 102 and/or the electronic device 104 to configure the selected virtual object kit 122, e.g., the bike kit 122k, to generate the target virtual object.

Figure 1F:
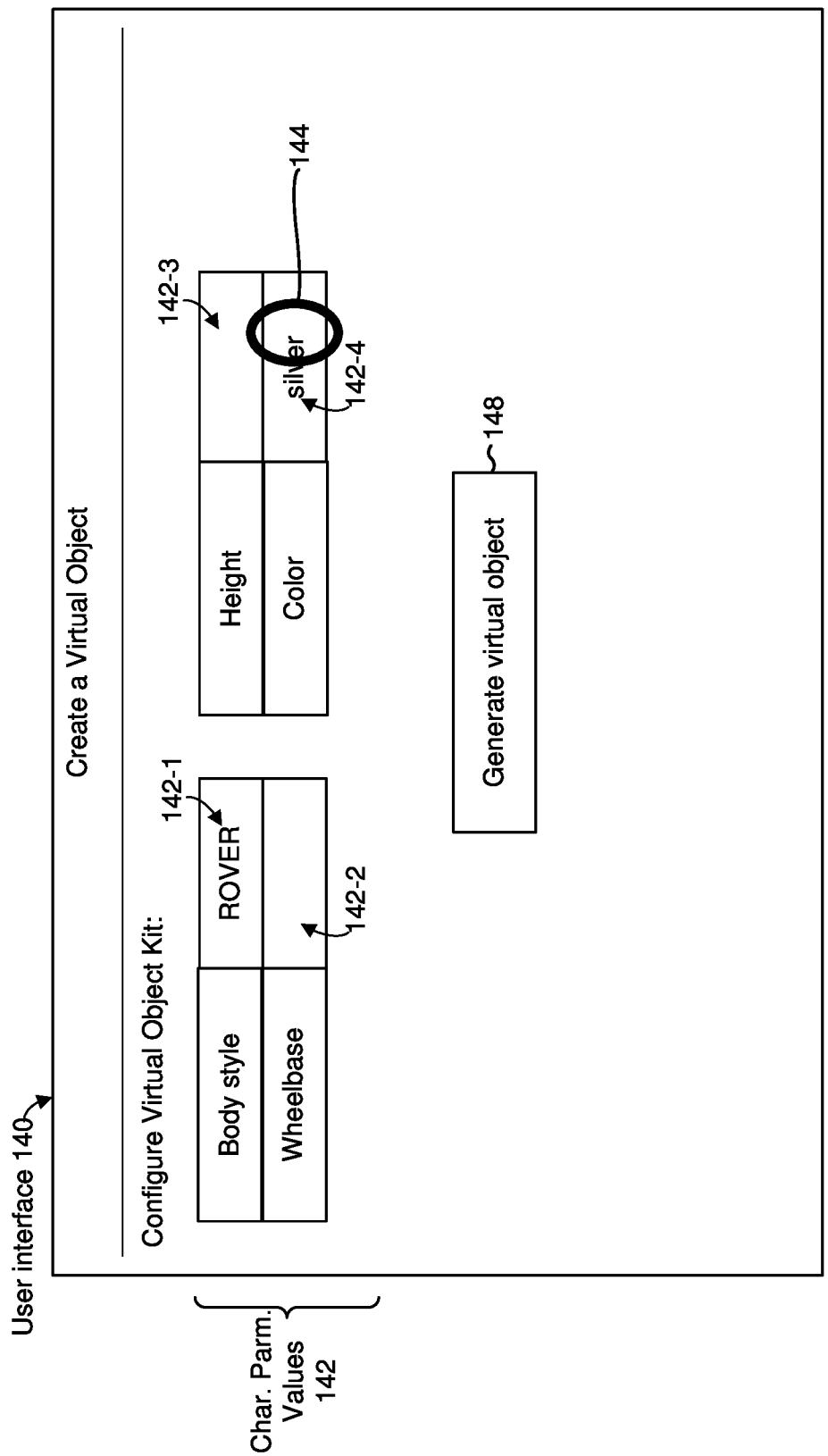

FIG. 1F illustrates an example user interface 140 for configuring the selected virtual object kit to generate the target virtual object. In some implementations, the user interface 140 displays one or more input fields for obtaining user inputs for one or more characteristic parameter values 142 of the selected virtual object kit 122. For example, the bike kit 122k may have a characteristic parameter value 142-1 corresponding to a body style of the virtual bike, a characteristic parameter value 142-2 corresponding to a wheelbase of the virtual bike, a characteristic parameter value 142-3 corresponding to a height of the virtual bike, and a characteristic parameter value 142-4 corresponding to a color of the virtual bike. In some implementations, the input field or input fields corresponding to one or more of the characteristic parameter values (e.g., the characteristic parameter value 142-1) are prepopulated based on, for example, the uploaded image or the text-based description of the target virtual object. In some implementations, the user 10 provides a user input 144 corresponding to one or more characteristic parameter values, e.g., the characteristic parameter value 142-4. FIG. 1G illustrates a user input 146 activating an affordance 148. When activated, the affordance 148 may trigger the controller 102 and/or the electronic device 104 to use the selected virtual object kit 122, configured with the characteristic parameter values 142, to generate the target virtual object.

Figure 1H:
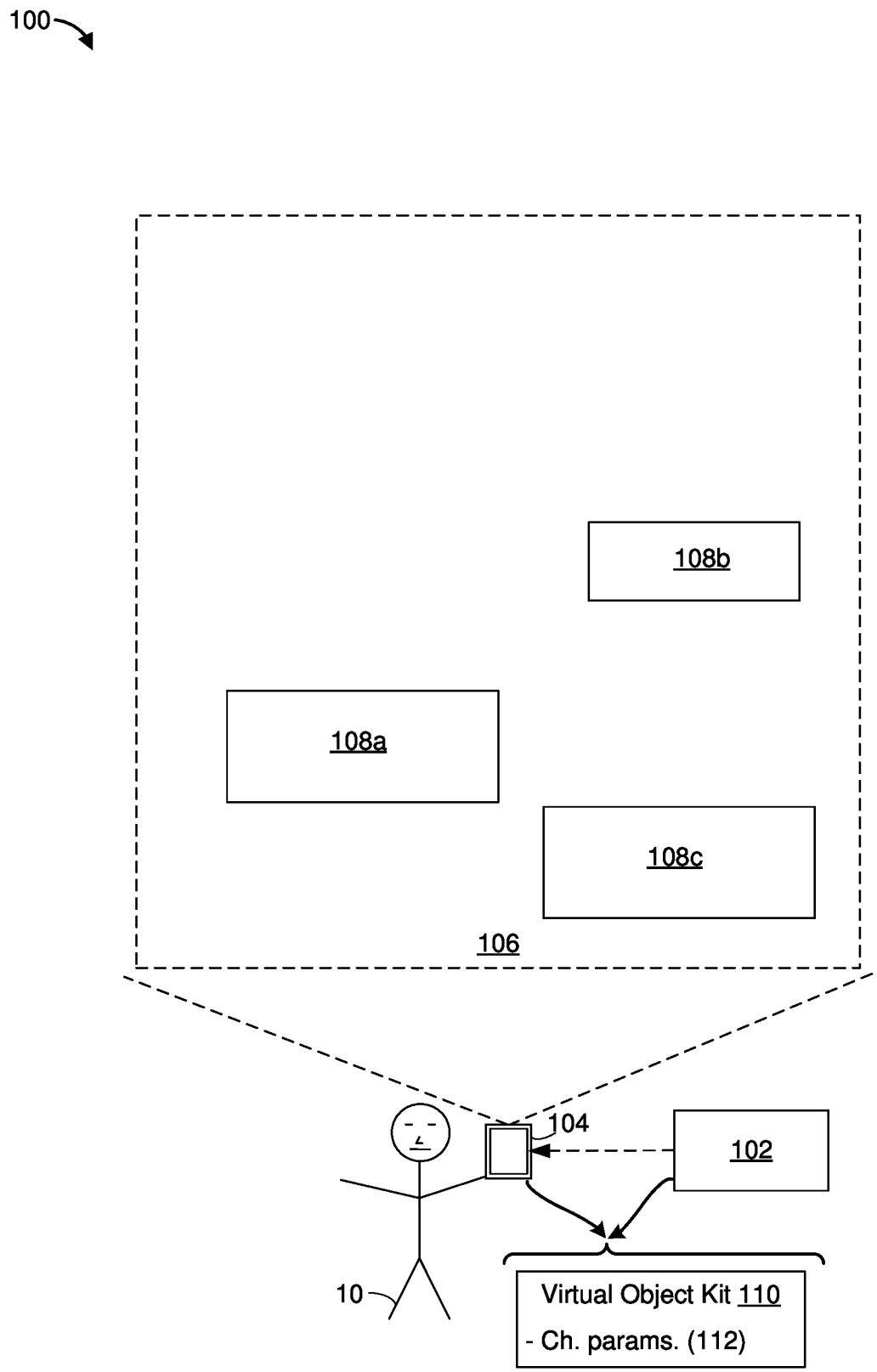
FIG. 1H depicts an exemplary system for use in various XR technologies.

In some implementations, the controller 102 and/or the electronic device 104 display the target virtual object in the XR environment 106. FIG. 1H illustrates the XR environment 106 of FIG. 1A with the generated target virtual object, e.g., a virtual bike 108c for space exploration.

In some implementations, the electronic device 104 is replaced by or is attached to a head-mountable device (HMD) worn by the user 10. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 104 can be attached to the head-mountable enclosure. In various implementations, the head-mountable enclosure is shaped to form a receptacle for receiving another device that includes a display (e.g., the electronic device 104). For example, in some implementations, the electronic device 104 slides/snaps into or otherwise attaches to the head-mountable enclosure. In some implementations, the display of the device attached to the head-mountable enclosure presents (e.g., displays) the XR environment 106. In various implementations, examples of the electronic device 104 include smartphones, tablets, media players, laptops, etc.

Figure 2:
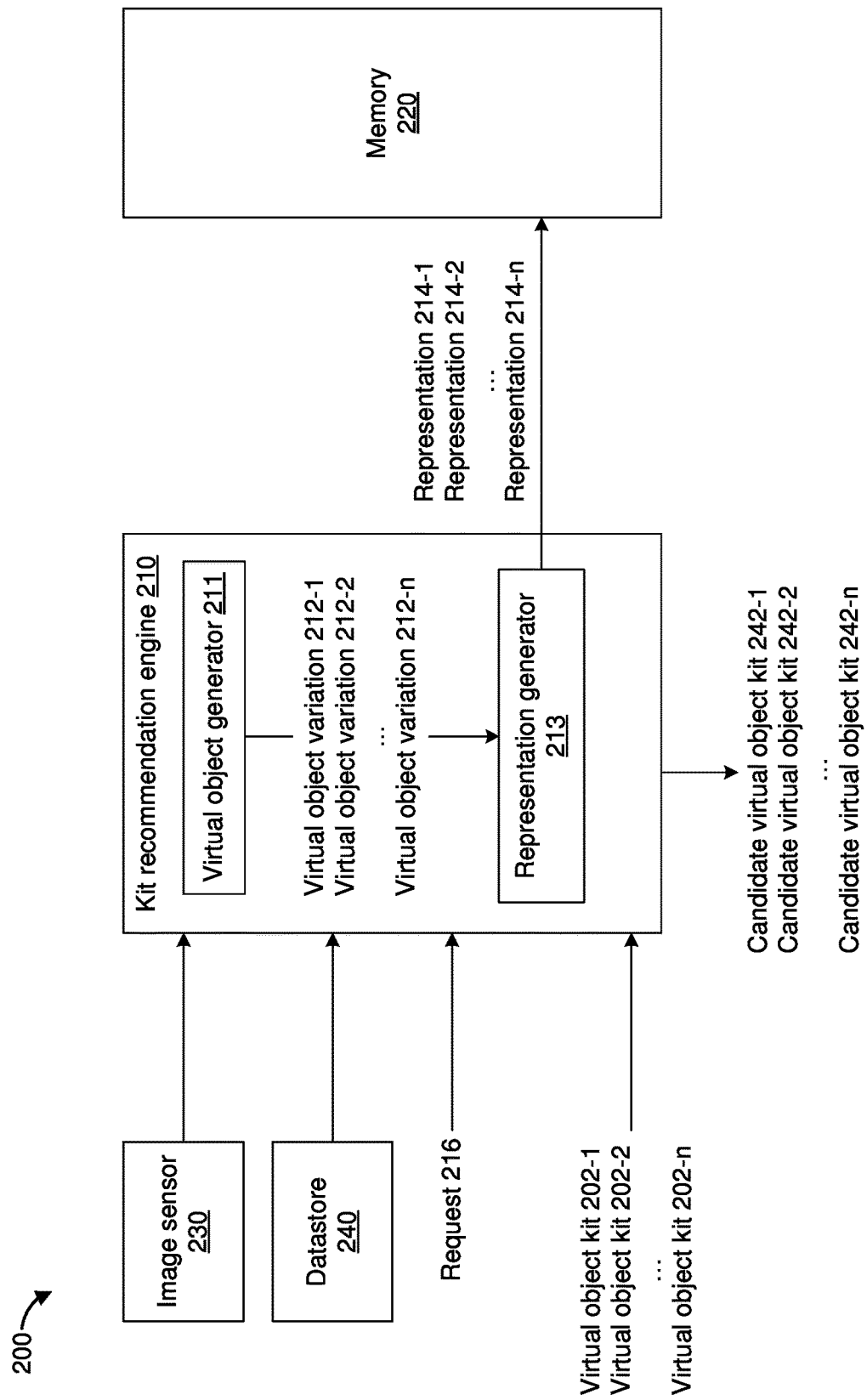
FIG. 2 illustrates an example system that identifies a virtual object kit for generating a target virtual object according to various implementations.

FIG. 2 illustrates an example system 200 that identifies a virtual object kit to use to generate a target virtual object, according to various implementations. In some implementations, the system 200 resides at the controller 102 and/or the electronic device 104 shown in FIG. 1A.

In some implementations, a kit recommendation engine 210 obtains a plurality of virtual object kits 202-1, 202-2, . . . , 202-n (collectively referred to as virtual object kits 202 and generically referred to as a virtual object kit 202). The virtual object kits 202 may generate variations of respective virtual object types. For example, the virtual object kit 202-1 may generate variations of virtual chairs, such as dining chairs, office chairs, and rocking chairs. As another example, the virtual object kit 202-2 may generate variations of ships, such as cruise ships, aircraft carriers, and submarines. Each virtual object kit 202 is associated with a set of one or more characteristic parameters. For example, the virtual object kit 202-1 for generating virtual chairs may be associated with a characteristic parameter that determines a number of legs that a virtual chair has. In some implementations, a virtual object kit 202 is associated with multiple characteristic parameters. For example, the virtual object kit 202-1 for generating virtual chairs may be associated with a first characteristic parameter that determines a number of legs that a virtual chair has and a second characteristic parameter that determines a length of the legs.

In some implementations, a virtual object generator 211 generates a respective subset of possible virtual object variations 212-1, 212-2, . . . , 212-n (collectively referred to as subsets of possible virtual object variations 212 and generically referred to as a subset of possible virtual object variations 212) for each virtual object kit 202. For example, the virtual object generator 211 generates a subset of possible virtual object variations 212-1 for the virtual object kit 202-1 by assigning corresponding values to the characteristic parameter associated with the virtual object kit 202-1, e.g., based on a distribution criterion. Assigning different values to the characteristic parameter may result, for example, in the generation of virtual objects representing a dining chair, an office chair, a rocking chair, etc. In some implementations, the virtual object generator 211 assigns the values to the characteristic parameter based on a distribution criterion. For example, the kit recommendation engine 210 may assign the values to the characteristic parameter randomly or according to a uniform distribution criterion. Assigning values to the characteristic parameter based on a distribution criterion may facilitate the generation of a representative subset of possible virtual object variations 212 for each virtual object kit 202.

In some implementations, a representation generator 213 generates representations 214-1, 214-2, . . . , 214-n (collectively referred to as representations 214 and generically referred to as a representation 214) of the virtual object variations 212. For example, the representations 214 may include images of the virtual object variations 212. In some implementations, the images of the virtual object variations 212 include images obtained (e.g., captured, generated, and/or synthesized) from multiple fields-of-view. In some implementations, the representation generator 213 stores the representations 214 in a memory 220.

In some implementations, the representations 214 include the characteristic parameter values that are associated with the virtual object variations 212. For example, the memory 220 may store a first characteristic parameter value that describes a number of legs that a virtual chair has and a second characteristic parameter value that describes a length of the legs, in the case of virtual object variations 212-1 generated by the virtual object kit 202-1.

In some implementations, the representation generator 213 converts the characteristic parameter values to a voxel representation, which may include coordinates (e.g., in an n-dimensional space where axis values correspond to characteristic parameter values) and/or a color value (e.g., red, green and blue light (RGB) color value(s)). Storing the representations 214 in this way facilitates representing multiple characteristic parameter values that are associated with a virtual object variation 212. For example, a first characteristic parameter value may be represented as a coordinate along an x-axis, a second characteristic parameter value may be represented as a coordinate along a y-axis, and a third characteristic parameter value may be represented as a coordinate along a z-axis. Coordinates in a color space (e.g., an RGB color space or a CMYK color space) may be used to represent additional characteristic parameter values.

In some implementations, the kit recommendation engine 210 receives a request 216 to assemble a target virtual object (e.g., a desired virtual object). For example, the kit recommendation engine 210 may receive a request to assemble a virtual object representing a pirate ship. The kit recommendation engine 210 responds to the request 216 by identifying a subset of the virtual object kits 202 based on the target virtual object being within a similarity threshold of one or more virtual object variations 212 generated using the subset of the virtual object kits 202.

In some implementations, the request 216 includes an input image of the target virtual object. The input image may be received, for example, from an image sensor 230 or from a datastore 240. For example, in some implementations, a user captures an image of a physical article for which the user desires to create a corresponding virtual object.

In some implementations, the kit recommendation engine 210 identifies one or more virtual object variations 212 that are within the similarity threshold of the target virtual object by performing an image search. The image search identifies respective images of the one or more virtual object variations 212 that match (e.g., are within a similarity threshold of) the input image. In some implementations, the images of the virtual object variations 212 are ranked according to their respective degrees of similarity to the input image.

In some implementations, the kit recommendation engine 210 outputs one or more candidate virtual object kits 242-1, 242-2, . . . , 242-n (collectively referred to as candidate virtual object kits 242 and generically referred to as a candidate virtual object kit 242) corresponding to the images that match the input image. The candidate virtual object kits 242 are virtual object kits that can be used to generate virtual objects that are within a similarity threshold to the target virtual object.

In some implementations, the kit recommendation engine 210 determines the characteristic parameter values that correspond to the virtual object variations that are within the similarity threshold of the target virtual object. For example, the kit recommendation engine 210 may obtain the characteristic parameter values that are associated with the virtual object variations 212 corresponding to the images that are within the similarity threshold of the input image.

In some implementations, the kit recommendation engine 210 determines the characteristic parameter value corresponding to the target virtual object based on characteristic parameter values corresponding to one or more virtual object variations 212 that are within the similarity threshold of the target virtual object. For example, if two virtual object variations 212 are within the similarity threshold of the target virtual object, the kit recommendation engine 210 may perform interpolation based on the characteristic parameter values associated with those virtual object variations 212 to determine the characteristic parameter value corresponding to the target virtual object.

In some implementations, the kit recommendation engine 210 determines the characteristic parameter value corresponding to the target virtual object based on a degree of similarity between the target virtual object and the virtual object variations 212. For example, the kit recommendation engine 210 may determine the characteristic parameter value based on the virtual object variation that is most similar to the target virtual object.

In some implementations, the request 216 includes a search query for the target virtual object, which the kit recommendation engine 210 converts to a voxel representation. The search query may include data such as an image, text, and/or parameter data specifying desired characteristics of the target virtual object. In some implementations, the kit recommendation engine 210 uses a neural network to convert the search query to the voxel representation.

The voxel representation of the search query may include coordinates (e.g., in a three-dimensional space) and/or a color value (e.g., an RGB color value). Representing the search query in this way facilitates representing multiple characteristics that are associated with the target virtual object. For example, a first characteristic may be represented as a coordinate along an x-axis, a second characteristic may be represented as a coordinate along a y-axis, and a third characteristic may be represented as a coordinate along a z-axis. Coordinates in a color space (e.g., an RGB color space or a CMYK color space) may be used to represent additional characteristics of the target virtual object.

In some implementations, the kit recommendation engine 210 determines characteristic parameter values to use for generating the target virtual object. The kit recommendation engine 210 identifies one or more virtual object variations 212 that are within a threshold range of characteristic parameter values associated with the target virtual object. For example, the kit recommendation engine 210 may identify one or more virtual object variations 212 whose voxel representations are within a threshold distance of the voxel representation of the search query in the coordinate system of the voxel representations.

In some implementations, the system 200 displays representations of the candidate virtual object kits 242. These representations may include, for example, example virtual object variations that may be generated by each candidate virtual object kit 242. The system 200 may obtain an input (e.g., a user input) indicating a user selection of a candidate virtual object kit 242 to use to generate the target virtual object (e.g., the user input 134 shown in FIG. 1D). The input may be obtained, for example, using a keyboard, a mouse, a touchscreen interface, and/or a voice input.

FIG. 3 is a block diagram of an example kit recommendation engine 300 in accordance with some implementations. In some implementations, the kit recommendation engine 300 implements the kit recommendation engine 210 shown in FIG. 2. In various implementations, the kit recommendation engine 300 obtains (e.g., receives) virtual object kits that generate variations of respective virtual object types. Each virtual object kit is associated with a characteristic parameter. For each virtual object kit, the kit recommendation engine 300 generates a subset of possible virtual object variations of the virtual object type that the virtual object kit can generate by assigning corresponding values to the characteristic parameter based on a distribution criterion. In response to a request to assemble a target virtual object, the kit recommendation engine 300 identifies a subset of the virtual object kits based on the target virtual object being within a similarity threshold of one or more virtual object variations generated using the subset of the plurality of virtual object kits.

In some implementations, a virtual object kit obtainer 310 obtains a plurality of virtual object kits 302-1, 302-2, ..., 302-n (collectively referred to as virtual object kits 302 and generically referred to as a virtual object kit 302), for example, from a datastore or from a network-connected resource. Each virtual object kit 302 may generate a type of virtual object. For example, the virtual object kit 302-1 may generate variations of bikes, such as sports bikes, dirt bikes, and cruisers. The virtual object kit 302-2 may generate variations of sandwiches, such as hot dogs and hamburgers. In some implementations, each virtual object kit 302 is associated with a respective characteristic parameter. For example, the virtual object kit 302-1 may be associated with a characteristic parameter that determines a color of the bike. In some implementations, a virtual object kit 302 is associated with multiple characteristic parameters. For example, the virtual object kit 302-1 may be associated with a first characteristic parameter that determines a color of the bike (e.g., the characteristic parameter value 142-4 shown in FIG. 1E), a second characteristic parameter that determines a body type of the bike (e.g., dirt bike, cruiser, sports bike, etc., for example, the characteristic parameter value 142-1 shown in FIG. 1E), a third characteristic parameter that determines a wheelbase of the bike (e.g., the characteristic parameter value 142-2 shown in FIG. 1E), and a fourth characteristic parameter that determines a height of the bike (e.g., the characteristic parameter value 142-3 shown in FIG. 1E).

In some implementations, a virtual object generator 320 generates a respective subset of possible virtual object variations 322-1, 322-2, ..., 322-n (collectively referred to as subsets of possible virtual object variations 322 and generically referred to as a subset of possible virtual object variations 322) for each virtual object kit 302. The virtual object generator 320 may assign corresponding values to the characteristic parameter or parameters associated with each virtual object kit 302 to generate the virtual object variations 322. For example, assigning corresponding values to characteristic parameters for the virtual object kit 302-1 may result in the generation of a red sports bike, a blue cruiser, a yellow dirt bike, etc.

In some implementations, to conserve computational resources, the virtual object generator 320 generates a subset of virtual object variations 322, e.g., rather than all possible virtual object variations 322 for a given virtual object kit 302. For example, the virtual object generator 320 may assign the corresponding values to the characteristic parameter or parameters based on a distribution criterion, such as a random distribution or a uniform distribution. Assigning values to the characteristic parameter or parameters based on a distribution criterion may facilitate the generation of a representative subset of possible virtual object variations 322 for each virtual object kit 302.

In some implementations, the virtual object generator 320 stores representations 324-1, 324-2, ..., 324-n (collectively referred to as representations 324 and generically referred to as a representation 324) of the virtual object variations 322 using a memory 326 (e.g., a non-transitory memory). The representations 324 may include images of the virtual object variations 322. In some implementations, the images of the virtual object variations 322 are obtained (e.g., captured, generated, and/or synthesized) from multiple fields-of-view. For example, a first field-of-view may be a frontal view. A second field-of-view may be a profile view. A third field-of-view may be a top-down view. A fourth field-of-view may be an isometric view.

In some implementations, the memory 326 stores the characteristic parameter values that are associated with the virtual object variations 322. For example, the memory 326 may store a first characteristic parameter value that describes a color of a bike and a second characteristic parameter value that describes a wheelbase of the bike, in the case of virtual object variations 322-1 generated by the virtual object kit 302-1.

In some implementations, a voxel representation converter 328 converts the characteristic parameter values to a voxel representation, which may include a set of one or more coordinates (e.g., in an n-dimensional space, for example, in a three-dimensional space) and/or a color value (e.g., an RGB color value). In some implementations, each dimension in the n-dimensional space corresponds to a respective parameter (e.g., the dimensions may include a color dimension, a size dimension, a material dimension, a strength dimension, etc.). Storing the representations 324 in this way facilitates representing multiple characteristic parameter values that are associated with a virtual object variation 322. For example, a three-dimensional voxel space can be used to represent a number of (e.g., three) characteristic parameter values. Coordinates in a color space (e.g., an RGB color space or a CMYK color space) may be used to represent additional characteristic parameter values independently or in combination with the set of one or more coordinates.

In some implementations, a request obtainer 330 receives a request 332 to assemble a target virtual object (e.g., a desired virtual object). For example, the request obtainer 330 may receive a request to assemble a virtual object representing an orange sports bike. In some implementations, the request 332 includes an input image of the target virtual object. For example, an image sensor 334 may capture an image of a physical article (e.g., a model of an orange sports bike) for which the user wishes to create a corresponding virtual object. In some implementations, the user selects the input image from a datastore 336.

In some implementations, the request obtainer 330 receives a search query for the target virtual object that the voxel representation converter 328 converts to a voxel representation. The search query may include a text string (e.g., "orange sports bike") or other data such as an image and/or parameter data specifying desired characteristics of the target virtual object. In some implementations, the voxel representation converter 328 uses a neural network to convert the search query to the voxel representation.

The voxel representation of the search query may include coordinates (e.g., in a three-dimensional space) and/or a color value (e.g., an RGB color value). Representing the search query in this way facilitates representing multiple characteristics that are associated with the target virtual object. For example, a set of three coordinates in three-dimensional space may represent respective values for three characteristics. In some implementations, coordinates in a color space (e.g., an RGB color space or a CMYK color space) represent additional characteristics of the target virtual object.

In some implementations, a search module 340 identifies a subset of the virtual object kits 302 based on the target virtual object being within a similarity threshold of one or more virtual object variations 322 generated using the subset of the virtual object kits 302. The search module 340 may identify one or more virtual object variations 322 that are within the similarity threshold of the target virtual object by performing an image search that identifies respective images of the one or more virtual object variations 322 that match (e.g., are within a similarity threshold of) the input image. The identified images may be ranked according to their respective degrees of similarity to the input image.

In some implementations, the search module 340 identifies one or more virtual object variations 322 that have voxel representations that are within a threshold distance of the voxel representation of the search query in the coordinate system of the voxel representation. The search module 340 may identify one or more virtual object variations 322 that have voxel representations that have color values that are within a threshold distance of the color value of the voxel representation of the search query in the color space (e.g., an RGB color space or a CMYK color space) of the voxel representation. Accordingly, the search module 340 may identify one or more virtual object variations 322 that are within a threshold range of characteristic parameter values associated with the target virtual object. In some implementations, the search module 340 identifies the virtual object kits 302 that correspond to the identified virtual object variations 322.

In some implementations, the search module 340 outputs one or more candidate virtual object kits 342-1, 342-2, . . . , 342-n (collectively referred to as candidate virtual object kits 342 and generically referred to as a candidate virtual object kit 342) corresponding to the identified virtual object variations 322. The candidate virtual object kits 342 are virtual object kits that can be used to generate virtual objects that are within a similarity threshold to the target virtual object.

In some implementations, the kit recommendation engine 300 displays representations of the candidate virtual object kits 342. These representations may include, for example, example virtual object variations that may be generated by the virtual object generator 320 using each candidate virtual object kit 342. The kit recommendation engine 300 may obtain an input (e.g., a user input) indicating a user selection of a candidate virtual object kit 342 to use to generate the target virtual object. The input may be obtained, for example, using a keyboard, a mouse, a touchscreen interface, and/or a voice input.

In some implementations, the search module 340 determines characteristic parameter values to use for generating the target virtual object. The search module 340 identifies one or more virtual object variations 322 that are within a threshold range of characteristic parameter values associated with the target virtual object. In some implementations, the search module 340 identifies one or more virtual object variations 322 whose voxel representations are within a threshold distance of the voxel representation of the search query in the coordinate system of the voxel representation. The identified virtual object variations may be ranked, for example, in order of the distance between the respective voxel representations of the virtual object variations 322 and the voxel representation of the target virtual object.

In some implementations, the search module 340 determines the characteristic parameter values that correspond to the virtual object variations that are within the similarity threshold of the target virtual object. For example, the search module 340 may obtain the characteristic parameter values that are associated with the virtual object variations 322 corresponding to the images that are within the similarity threshold of the input image. In some implementations, the search module 340 determines the characteristic parameter value based on the virtual object variation that corresponds to an image that is most similar to the input image representing the target virtual object.

In some implementations, the search module 340 determines the characteristic parameter value corresponding to the target virtual object based on characteristic parameter values corresponding to one or more virtual object variations 322 that are within the similarity threshold of the target virtual object. For example, if two virtual object variations 322 (e.g., a red sports bike and a yellow sports bike) are within the similarity threshold of the target virtual object (e.g., an orange sports bike), the search module 340 may perform interpolation based on the characteristic parameter values associated with those virtual object variations 322 to determine the characteristic parameter value corresponding to the target virtual object. The search module 340 may determine, for example, that the characteristic parameter value corresponding to an orange sports bike is between the characteristic parameter value corresponding to a red sports bike and the characteristic parameter value corresponding to a yellow sports bike.

Figure 4B:
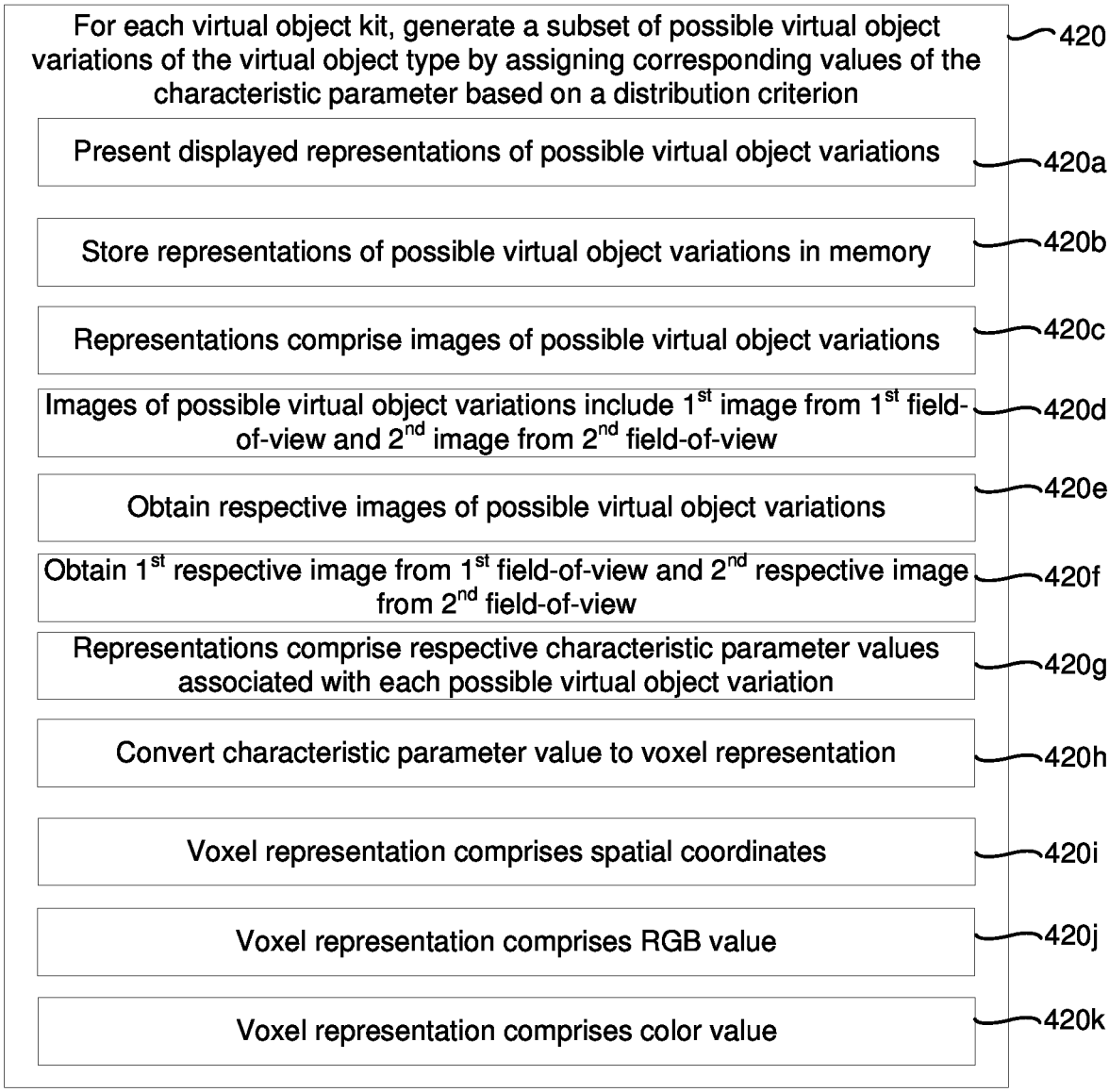
Figure 4C:
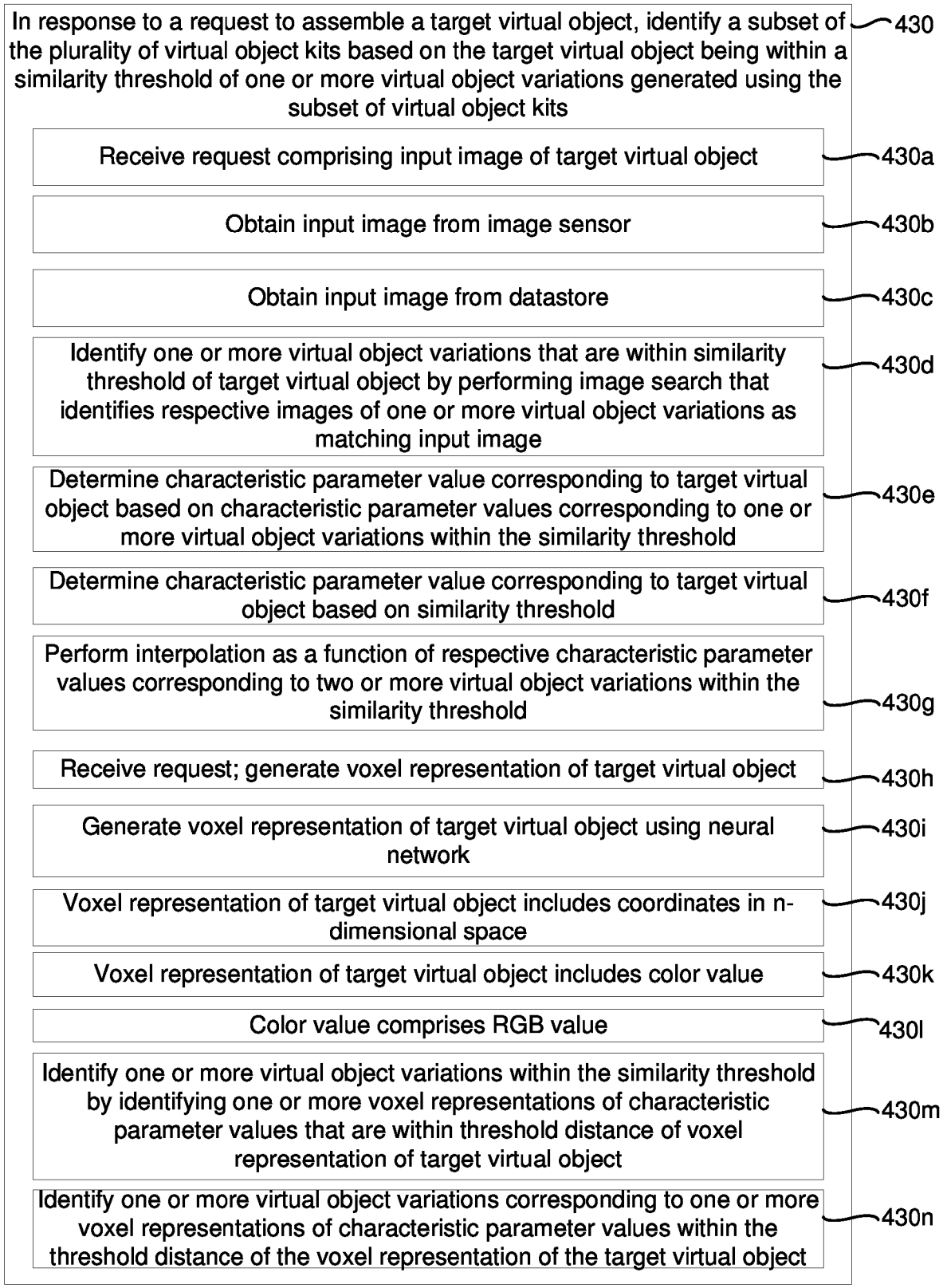

FIGS. 4A-4C are a flowchart representation of a method 400 for identifying a virtual object kit to use to generate a target virtual object, according to various implementations. In various implementations, the method 400 is performed by a device (e.g., the system 200 shown in FIG. 2 and/or the kit recommendation engine 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining a plurality of virtual object kits that generate variations of respective virtual object types. Each virtual object kit is associated with a characteristic parameter. The method 400 includes generating, for each virtual object kit, a subset of possible virtual object variations of the virtual object type by assigning corresponding values to the characteristic parameter based on a distribution criterion. In various implementations, the method 400 includes identifying, in response to a request to assemble a target virtual object, a subset of the plurality of virtual object kits based on the target virtual object being within a similarity threshold of one or more virtual object variations generated using the subset of the plurality of virtual object kits.

Referring to FIG. 4A, as represented by block 410, in various implementations, the method 400 includes obtaining a plurality of virtual object kits that generate variations of respective virtual object types. Each virtual object kit is associated with a characteristic parameter. In some implementations, the virtual object kits are obtained from a datastore or from a network-connected resource. Each virtual object kit may generate a type of virtual object, such as bikes, sandwiches, ships, etc. The characteristic parameter associated with each virtual object kit determines a characteristic of the virtual object type generated by the virtual object kit. Virtual object kits may be associated with multiple characteristic parameters. For example, a virtual object kit that generates virtual objects representing ships may be associated with characteristic parameters that determine the body type and dimensions of the virtual ships.

As represented by block 420, in various implementations, the method 400 includes generating, for each virtual object kit, a subset of possible virtual object variations of the virtual object type by assigning corresponding values to the characteristic parameter based on a distribution criterion. In some implementations, corresponding values are assigned to the characteristic parameter or parameter associated with each virtual object kit to generate the virtual object variations. For example, a virtual object kit that generates virtual objects representing bikes may generate a black bike, a white bike, or a red bike, depending on the configuration of characteristic parameter values.

Some virtual object kits are capable of generating a large number of virtual object variations, particularly virtual object kits that are associated with a large number of characteristic parameters or that are associated with characteristic parameters that may have float values. It may not be feasible to generate the entire range of possible virtual object variations for such virtual object kits. In some implementations, to conserve computational resources, the method 400 includes generating a subset of virtual object variations, e.g., rather than all possible virtual object variations for a given virtual object kit. The corresponding values may be assigned to the characteristic parameter or parameters based on a distribution criterion, such as a random distribution or a uniform distribution. Assigning values to the characteristic parameter or parameters based on a distribution criterion may facilitate generating a representative subset of possible virtual object variations for each virtual object kit.

Referring now to FIG. 4B, in some implementations, as represented by block 420a, the method 400 includes presenting displayed representations of the possible virtual object variations. In some implementations, as represented by block 420b, the method 400 includes storing representations of the virtual object variations using a memory, e.g., a non-transitory memory. As represented by block 420c, the representations may include images of the virtual object variations. In some implementations, as represented by block 420d, the images of the possible virtual object variations include a first image from a first field-of-view, such as a frontal view, and a second image from a second field-of-view, such as a profile view. The images of the possible virtual object variations may include images from other fields-of-view, such as a top-down view and/or an isometric view.

As represented by block 420e, in some implementations, the method 400 includes obtaining respective images of the possible virtual object variations. The images may be obtained, for example, from an image sensor and/or a datastore. As represented by block 420f, the method 400 may include obtaining a first respective image from a first field-of-view and a second respective image from a second field-of-view. For example, a first field-of-view may be a frontal view. A second field-of-view may be a profile view. A third field-of-view may be a top-down view. A fourth field-of-view may be an isometric view.

In some implementations, as represented by block 420g, the representations include respective characteristic parameter values that are associated with each possible virtual object variation. For example, in the case of virtual object variations generated by a virtual object kit that generates virtual bikes, a memory may store a first characteristic parameter that describes a color of a bike and a second characteristic parameter that represents a body type of the bike.

In some implementations, as represented by block 420h, the method 400 includes converting a characteristic parameter value to a voxel representation. As represented by block 420i, the voxel representation may include a color value. The color value may be an RGB value, as represented by block 420j. In some implementations, the color value may be a CMYK value. In some implementations, as represented by block 420k, the voxel representation includes a set of one or more coordinates (e.g., in an n-dimensional space, for example, in a three-dimensional space). Storing the representations using a voxel representation facilitates representing multiple characteristic parameter values that are associated with a virtual object variation. For example, a three-dimensional voxel space can be used to represent a number of (e.g., three) characteristic parameter values. Coordinates in a color space (e.g., an RGB color space or a CMYK color space) may be used to represent additional characteristic parameter values independently or in combination with the set of one or more coordinates.

As represented by block 430, in various implementations, the method 400 includes responding to a request to assemble a target virtual object by identifying a subset of the plurality of virtual object kits based on the target virtual object kit being within a similarity threshold of one or more virtual object variations generated using the subset of the plurality of virtual object kits. For example, the system 200 may receive a request to assemble a virtual pirate ship and may respond by identifying one or more virtual object kits that can be used to generate a virtual pirate ship based on how closely the representative virtual object variations generated by each virtual object kit resemble the target virtual object, e.g., a pirate ship.

Referring to FIG. 4C, as represented by block 430a, in some implementations, the method 400 includes receiving a request including an input image of a target virtual object (e.g., a desired virtual object), such as a pirate ship. In some implementations, as represented by block 430b, the method 400 includes obtaining the input image from an image sensor. For example, a user may use a camera to capture an image of a physical article (e.g., a model of a pirate ship) for which the user wishes to create a corresponding virtual object. In some implementations, as represented by block 430c, the input image is obtained from a datastore. For example, the user may select the input image from a catalog of images available from the datastore.

In some implementations, as represented by block 430d, the method 400 includes identifying one or more virtual object variations that are within the similarity threshold of the target virtual object by performing an image search. The image search identifies respective images of the one or more virtual object variations that match the input image, e.g., are within a similarity threshold of the input image. In some implementations, the images of the virtual object variations are ranked according to their respective degrees of similarity to the input image.

In some implementations, as represented by block 430e, the method 400 includes determining a characteristic parameter value corresponding to the target virtual object based on characteristic parameter values corresponding to one or more virtual object variations that are within the similarity threshold of the target virtual object. For example, the system 200 may obtain the characteristic parameter values that are associated with the virtual object variations corresponding to the images that are within the similarity threshold of the input image. In some implementations, as represented by block 430*f*, the method 400 includes determining the characteristic parameter value corresponding to the target virtual object based on a similarity threshold between the target virtual object and the one or more virtual object variations. For example, the system 200 may determine the characteristic parameter value based on the virtual object variation that corresponds to an image that is most similar to the input image representing the target virtual object.

In some implementations, as represented by block 430*g*, the method 400 includes determining the characteristic parameter value corresponding to the target virtual object by performing interpolation as a function of respective characteristic parameter values corresponding to two or more virtual object variations that are within the similarity threshold of the target virtual object. For example, if two virtual object variations (e.g., a red sports bike and a yellow sports bike) are within the similarity threshold of the target virtual object (e.g., an orange sports bike), the system 200 may perform interpolation based on the characteristic parameter values associated with those virtual object variations to determine the characteristic parameter value corresponding to the target virtual object. The system 200 may determine, for example, that the characteristic parameter value corresponding to an orange sports bike is between the characteristic parameter value corresponding to a red sports bike and the characteristic parameter value corresponding to a yellow sports bike.

In some implementations, as represented by block 430*h*, the method 400 includes receiving a search query for the target virtual object and generating a voxel representation of the target virtual object. The search query may include a text string (e.g., "orange sports bike") or other data such as an image and/or parameter data specifying desired characteristics of the target virtual object. In some implementations, as represented by block 430*i*, a neural network is used to generate the voxel representation of the target virtual object.

As represented by block 430*j*, in some implementations, the voxel representation of the target virtual object includes a set of one or more coordinates in an n-dimensional space (e.g., a set of three coordinates in a three-dimensional space where each dimension represents a corresponding characteristic parameter). For example, an x-axis coordinate may represent a first characteristic of the target virtual object, a y-axis coordinate may represent a second characteristic of the target virtual object, and a z-axis coordinate may represent a third characteristic of the target virtual object. As represented by block 430*k*, in some implementations, the voxel representation of the target virtual object includes a color value, e.g., coordinates in a color space. As represented by block 430*l*, the color value may be an RGB value. Coordinates in a color space (e.g., an RGB color space or a CMYK color space) may be used to represent additional characteristics of the target virtual object.

In some implementations, as represented by block 430*m*, the method 400 includes identifying one or more voxel representations that are within a threshold distance of the voxel representation of the target virtual object, e.g., in the coordinate system of the voxel representation. In some implementations, the system 200 identifies voxel representations that have color values that are within a threshold distance of the color value of the voxel representation of the target virtual object in the color space (e.g., an RGB color space or a CMYK color space) of the voxel representation. In some implementations, as represented by block 430*n*, the method 400 includes identifying one or more virtual object variations that correspond to the voxel representations of characteristic parameter values within the threshold distance of the voxel representation of the target virtual object. In some implementations, the virtual object kits that correspond to the identified virtual object variations may be identified.

Figure 5:
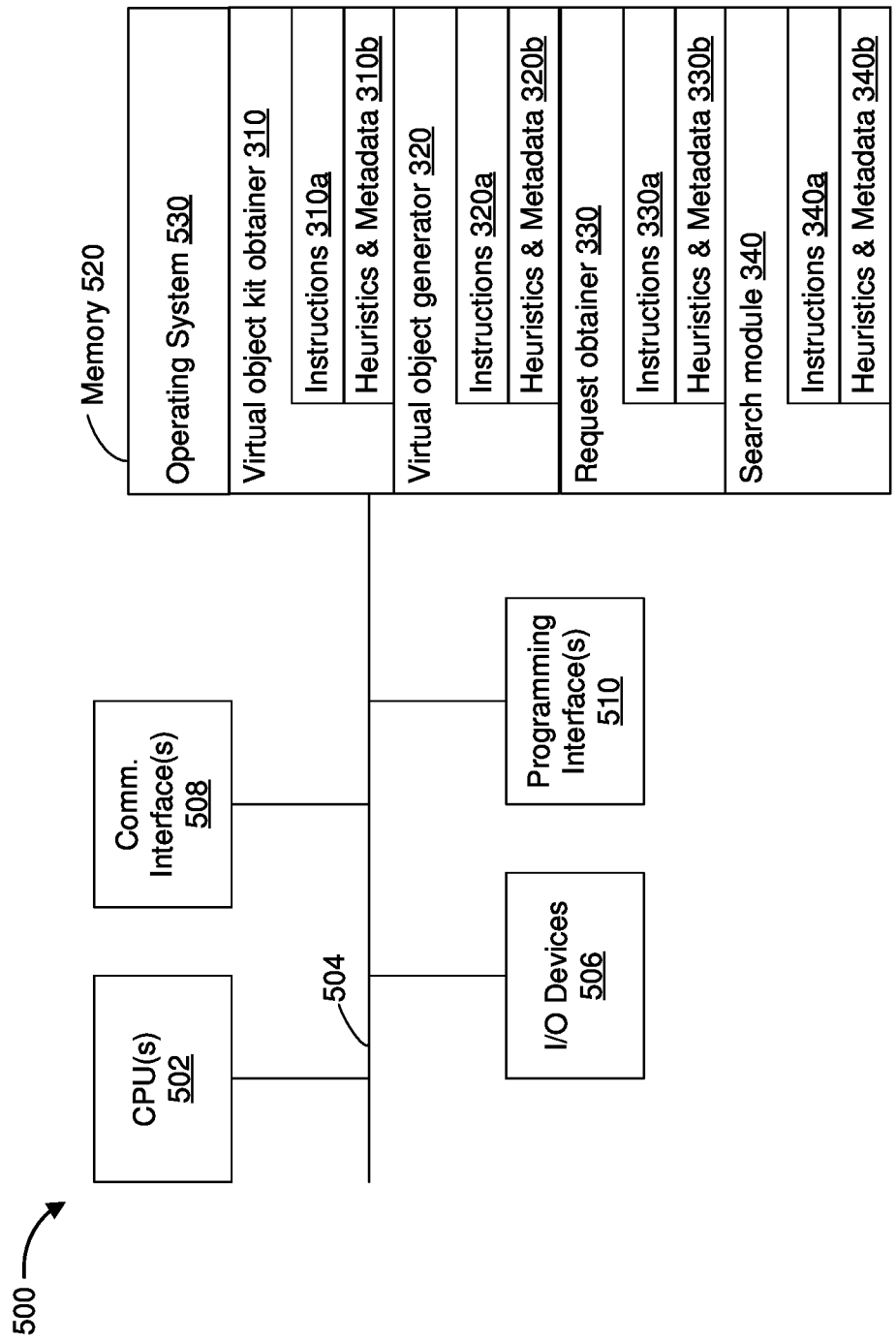
FIG. 5 is a block diagram of a device in accordance with some implementations.

FIG. 5 is a block diagram of a device 500 enabled with one or more components of a device (e.g., controller 102 and/or the electronic device 104 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506, one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the virtual object kit obtainer 310, the virtual object generator 320, the request obtainer 330, and the search module 340. As described herein, the virtual object kit obtainer 310 may include instructions 310*a* and/or heuristics and metadata 310*b* for obtaining virtual object kits from a datastore or from a network-connected resource. As described herein, the virtual object generator 320 may include instructions 320*a* and/or heuristics and metadata 320*b* for generating a respective subset of possible virtual object variations for each virtual object kit. As described herein, the request obtainer 330 may include instructions 330*a* and/or heuristics and metadata 330*b* for receiving a request to assemble a target virtual object. As described herein, the search module 340 may include instructions 340*a* and/or heuristics and metadata 340*b* for identifying a subset of the virtual object kits based on the target virtual object being within a similarity threshold of one or more virtual object variations generated using the subset of the virtual object kits.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, a non-transitory memory, and one or more processors coupled with the non-transitory memory:
   obtaining a plurality of virtual object kits that generate variations of respective virtual object types, wherein each virtual object kit is associated with a characteristic parameter;
   for each virtual object kit, generating a subset of possible virtual object variations of each respective virtual object type by assigning corresponding values to the characteristic parameter based on a distribution criterion; and
   in response to a request to assemble a target virtual object, identifying a subset of the plurality of virtual object kits based on the target virtual object being within a similarity threshold of one or more virtual object variations generated using the subset of the plurality of virtual object kits.

2. The method of claim 1, further comprising obtaining respective images of the possible virtual object variations.

3. The method of claim 2, further comprising obtaining a first respective image of a first virtual object variation from a first field-of-view and a second respective image of the first virtual object variation from a second field-of-view different from the first field-of-view.

4. The method of claim 1, further comprising presenting displayed representations of the possible virtual object variations.

5. The method of claim 1, further comprising storing representations of the possible virtual object variations in the non-transitory memory.

6. The method of claim 5, wherein the representations comprise images of the possible virtual object variations.

7. The method of claim 6, wherein the images of the possible virtual object variations comprise a first image of a first virtual object variation captured from a first field-of-view and a second image of the first virtual object variation captured from a second field-of-view.

8. The method of claim 5, wherein the representations comprise respective characteristic parameter values associated with each possible virtual object variation.

9. The method of claim 8, further comprising converting a first characteristic parameter value to a voxel representation.

10. The method of claim 9, wherein the voxel representation comprises a color value.

11. The method of claim 10, wherein the color value comprises a set of red, green and blue (RGB) values.

12. The method of claim 9, wherein the voxel representation comprises a set of coordinates in an n-dimensional space.

13. The method of claim 1, further comprising receiving the request, the request comprising an input image of the target virtual object.

14. The method of claim 13, further comprising obtaining the input image from an image sensor.

15. The method of claim 13, further comprising obtaining the input image from a datastore.

16. The method of claim 13, further comprising identifying the one or more virtual object variations that are within the similarity threshold of the target virtual object by performing an image search that identifies respective images of the one or more virtual object variations as matching the input image.

17. The method of claim 1, further comprising determining a characteristic parameter value corresponding to the target virtual object based on characteristic parameter values corresponding to the one or more virtual object variations that are within the similarity threshold of the target virtual object.

18. The method of claim 1, further comprising performing interpolation as a function of respective characteristic parameter values corresponding to two or more virtual object variations that are within the similarity threshold of the target virtual object.

19. A device comprising:
one or more processors;
a non-transitory memory; and
one or more programs stored in the non-transitory memory, which, when executed by the one or more processors, cause the device to:
 obtain a plurality of virtual object kits that generate variations of respective virtual object types, wherein each virtual object kit is associated with a characteristic parameter;
 for each virtual object kit, generate a subset of possible virtual object variations of each respective virtual object type by assigning corresponding values to the characteristic parameter based on a distribution criterion; and
 in response to a request to assemble a target virtual object, identify a subset of the plurality of virtual object kits based on the target virtual object being within a similarity threshold of one or more virtual object variations generated using the subset of the plurality of virtual object kits.

20. A non-transitory memory storing one or more programs, which, when executed by one or more processors of a device, cause the device to:
 obtain a plurality of virtual object kits that generate variations of respective virtual object types, wherein each virtual object kit is associated with a characteristic parameter;
 for each virtual object kit, generate a subset of possible virtual object variations of each respective virtual object type by assigning corresponding values to the characteristic parameter based on a distribution criterion; and
 in response to a request to assemble a target virtual object, identify a subset of the plurality of virtual object kits based on the target virtual object being within a similarity threshold of one or more virtual object variations generated using the subset of the plurality of virtual object kits.

* * * * *